US006589584B1

(12) United States Patent
Stark

(10) Patent No.: US 6,589,584 B1
(45) Date of Patent: Jul. 8, 2003

(54) FOOD INGREDIENT

(75) Inventor: Ann M. Stark, Marion, IA (US)

(73) Assignee: Cargill, Incorporated, Minneapolis, MN (US)

( * ) Notice: Subject to any disclaimer, the term of this patent is extended or adjusted under 35 U.S.C. 154(b) by 0 days.

(21) Appl. No.: 09/293,661

(22) Filed: Apr. 16, 1999

(51) Int. Cl.$^7$ ............................................... A21D 10/04
(52) U.S. Cl. ....................... 426/554; 426/555; 426/622; 426/634
(58) Field of Search ................................ 426/555, 549, 426/552, 618, 615, 634, 554, 622

(56) References Cited

U.S. PATENT DOCUMENTS

| 3,497,360 | A |   | 2/1970  | Schaefer et al. |         |
|-----------|---|---|---------|-----------------|---------|
| 3,713,837 | A |   | 1/1973  | Leidy et al.    |         |
| 3,949,093 | A |   | 4/1976  | Mehltretter et al. | 426/24 |
| 3,992,554 | A | * | 11/1976 | Blake et al.    | 426/557 |
| 4,109,018 | A | * | 8/1978  | Thompson        | 426/62  |
| 4,238,515 | A | * | 12/1980 | Shemer          | 426/104 |
| 4,481,222 | A | * | 11/1984 | Fan             | 426/62  |
| 4,588,600 | A | * | 5/1986  | Suderman        | 426/555 |
| 5,320,859 | A |   | 6/1994  | Namdari         | 426/551 |
| 5,506,211 | A |   | 4/1996  | Barnes et al.   | 514/27  |
| 5,569,459 | A |   | 10/1996 | Shlyankevich    | 424/195.1 |

FOREIGN PATENT DOCUMENTS

| DE | 1448875  | 9/1976 |
| DE | 3708622  | 9/1988 |
| EP | 0143391  | 6/1985 |
| GB | 1522439  | 8/1978 |

OTHER PUBLICATIONS

Anonymous, "1–2–3–4–5 Bread", Web site: http://www.naturalland.com/cv/soy/sfbr6.html, 2 p.

Anonymous, "Cinnamon Soy Rolls", Web site: http://www.naturalland.com/cv/soy/sfbr1.html, 2 p.

Anonymous, "Soy Grits and Green Chile Bread", Web site: http://www.naturalland.com/cv/soy/sfbr7.html, 2 p.

Anonymous, "Thirty Percent Soy Bread", Web site: http://www.naturalland.com/cv/soy/sfbr5.html, 2 p.

Masters, S., "Soy Flour Baking", Web site: http://www.naturalland.com/cv/soy/sfb.html, 2 p.

Moosberg, F.O., "The Use of Soy Grits in Institutional Feeding", Soybean Digest, vol. 30, No. 1, XP001016114, 26–27, Nov. 1969.

* cited by examiner

Primary Examiner—Arthur L. Corbin
(74) Attorney, Agent, or Firm—Fulbright & Jaworski L.L.P.

(57) ABSTRACT

The present invention includes a food ingredient that comprises soy flour and gluten wherein the ratio of gluten to soy flour in the additive is greater than a natural ratio of gluten to flour in wheat flour. The ingredient is effective for making a food product having a structure and height substantially the same as a corresponding soy-free product made with wheat flour.

8 Claims, 2 Drawing Sheets

FOOD INGREDIENT

BACKGROUND OF THE INVENTION

The present invention relates to an ingredient that adds vegetable protein and/or phytochemicals to leavened and unleavened food products.

Soy products are known to have constituents of high nutritional value. One constituent is protein. The Food and Drug Administration, FDA, has recently proposed that food products containing 6.25 grams of soy protein per Reference Amount Customarily Consumed (RACC), that are low in fat and low cholesterol as well, may carry a health claim. FDA's proposal that 4 servings of 6.25 grams of soy protein per day (25 grams total) as a part of a low fat, low cholesterol diet may reduce the risk of coronary heart disease.

Soy also contains phytochemicals such as isoflavones, also referred to as phytoestrogens, have been associated with many positive health benefits. These health benefits include preventing hormone-dependent cancers and with substantially eliminating symptoms such as hot flashes in peri- and post-menopausal women as well as reducing the risk of osteoporosis. Soy flour has been reported to have isoflavone concentrations ranging from about 1 mg/g to about 3 mg/g of soy flour. Isoflavone levels in soy flour generally exceed those in other soy products, such as soy protein concentrates and isolates. Soy flour is also a good source of dietary fiber, minerals and B vitamins.

Despite their nutritional benefits, soy products have had only limited use in foods typically consumed in the United States because incorporation of soy products has produced deleterious effects on the organoleptic and textural properties of many types of foods. For example, soy-fortified bread, containing a high concentration of soy protein, typically exhibits undesirable characteristics such as diminished loaf volume, poor crumb grain, an uneven, "bumpy" crust and a flavor that is bitter or "beany". A soy-fortified unleavened food typically has a dough that is sticky and that has poor machinability. A soy-fortified dried dough, such as pasta is also soft and mealy in texture when cooked. These undesirable food properties have occurred with the use of soy flour, soy isolates and soy concentrates.

Patents, such as the Mehltretter et al. patent, U.S. Pat. No. 3,949,093 which issued Apr. 6, 1976, describe an incorporation of additives into a bread dough prior to baking in order to render the dough more amenable to receiving a higher protein concentration. In particular, the Mehltretter et al. patent describes adding to a dough an ester of a fatty acid containing twelve to eighteen carbon atoms and polyoxyethylene ether of a propylene glycol glycoside containing one to two moles of combined fatty acid per mole and 5 to 20 moles of combined ethylene oxide per mole.

Foods that have a structure which is based upon components of wheat flour rely, in some manner, on the action of gluten, which is a component of the wheat flour. Gluten is a mixture of proteins present in wheat and in other cereal grains. Gluten is naturally occurring in wheat flour and is advantageous in making leavened products such as bread because it has an elastic, cohesive nature which permits it to retain carbon dioxide bubbles generated by leavening agents, and therefore to form a uniform air cell structure that defines the bread.

Wheat flour has historically contained about 10% to 12% protein by weight of the flour. More recently, gluten levels in some wheat grown in the United States have dropped to a concentration that does not support acceptable air cell formation in yeast leavened dough. As a consequence, some wheat flour produced in the United States is supplemented with wheat gluten that is added to wheat flour in order to elevate the gluten to levels of about 10% to 12%. Gluten represents about 90% of the protein content of wheat flour. The protein composition of wheat gluten comprises gliadin in a concentration of about 39.1% by weight; glutenin in a concentration of about 35.1% by weight; and globulin in a concentration of about 6.75% by weight.

Attempts have been made to prepare baked products such as bread with soy flour and soy milk. These attempts have included an addition of gluten in a soy-based dough in a proportion that is equivalent to the proportion of gluten in wheat flour, referred to herein as a "natural ratio." Breads produced with this proportion of gluten to soy were very dense and had a more coarse texture and had a non-uniform air cell network.

SUMMARY OF THE INVENTION

Figure 1:
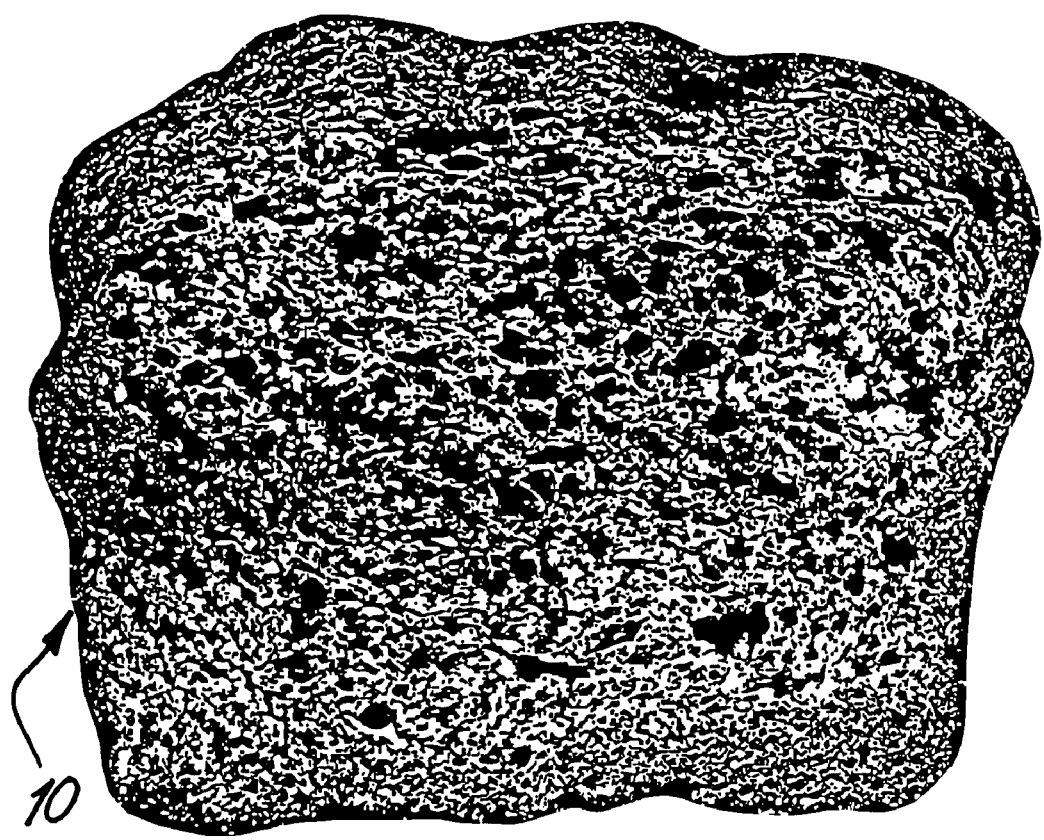
FIG. 1 is a top plan view of a slice of bread made with soy flour and gluten in a ratio of about 0.14:1 gluten to soy flour.

One embodiment of the present invention includes a food ingredient that comprises soy flour and gluten wherein a ratio of gluten to soy flour in the ingredient is greater than a ratio of gluten to flour in wheat flour. In one embodiment, the ratio of gluten to soy is at least about 1.5 times the natural ratio of gluten to wheat flour. The food ingredient is effective for making a food product, fortified with soy protein and/or phytochemicals, having a structure and height that are substantially the same as a corresponding soy-free product.

Another embodiment of the present invention includes a kit for making a food ingredient. The kit comprises a container that encloses gluten and a container that encloses soy flour. The kit also comprises instructions for blending the gluten and soy flour so that a product is prepared that has a ratio of gluten to soy flour of about 0.20:1 to about 0.40:1.

Another embodiment of the present invention includes a baked leavened product that comprises soy protein and/or phytochemicals. The baked leavened product, such as bread, has a soy protein concentration that is at least about 3 grams per 50 grams of product. The baked leavened product has an air cell structure, and height that are substantially the same as a soy-free baked leavened product, such as bread.

One other embodiment of the present invention includes a baked unleavened product. The baked unleavened product comprises soy flour and gluten wherein a ratio of gluten to soy flour is greater than the natural ratio of gluten to wheat flour.

One other embodiment of the present invention includes a leavened dough. The dough comprises gluten and soy flour in a ratio of gluten to soy flour that is greater than a natural ratio of gluten to flour in wheat flour. The dough also comprises wheat flour and a leavening agent. The dough has an air cell structure and air cell strength that are substantially the same as for dough which is soy flour free.

Another embodiment of the present invention includes an unleavened dough. The dough comprises gluten and soy flour in a ratio of gluten to soy flour that is greater than a natural ratio of gluten to flour in wheat flour. The dough also comprises wheat flour. The dough has a structure that is substantially the same as dough which is soy flour-free.

One other embodiment of the present invention includes a dried dough, such as a pasta. The dried dough comprises gluten and soy flour in a ratio of gluten to soy flour that is greater than a natural ratio of gluten to flour in wheat flour. The dough also comprises a wheat flour such as semolina. The dough has a structure that is substantially the same or improved as compared to dried dough that is soy-free.

DETAILED DESCRIPTION OF THE INVENTION

One embodiment of the present invention includes a food ingredient that comprises gluten and defatted soy flour in a proportion of gluten to defatted soy flour that is substantially greater than the proportion of gluten which is naturally present in wheat flour. In one particular embodiment, the ratio of gluten to defatted soy flour is at least about 1.5 times the natural ratio of gluten to wheat flour.

The term, "natural ratio," as used herein refers to the ratio of gluten to wheat flour that is present in wheat flour without addition or treatment other than grinding. The "natural ratio" is based upon a gluten concentration in wheat flour of about 10 to 12 percent by weight of the wheat flour and ranges from 0.11:1 for 10 percent gluten to 0.14:1 for 12 percent gluten. For purposes of clarity herein, the value of the natural ratio is 0.14:1 gluten to wheat flour.

The term "soy free" as used herein refers to a material that comprises no more than about five percent soy protein by weight.

The term "baked" as used herein refers to heating a dough or batter to fix a final structure through methods that include but are not limited to, frying, boiling, or heating in air.

The term "soy flour" as used herein refers to defatted soy flour and soy flour with fat. Oil content in soy flour ranges from less than one percent for defatted soy flour to 18 to 20 percent for full fat soy flour. Soy flour may contain many of the phytochemicals of a soybean. Soy flour comprises isoflavones in concentrations ranging from about 1 mg/g to about 3 mg/g of soy flour.

The food ingredient of the present invention is effective in making leavened and unleavened doughs and baked and dried goods that have structures and heights that are substantially the same as soy free products. These products have flavors and mouthfeels that are pleasing and that are substantially free of undesirable bitterness and "beanyness". The ratio of gluten to soy flour is about 0.20:1 gluten to soy flour to about 0.40:1 gluten to soy flour in the product for some product embodiments.

In comparison, the natural ratio of gluten to wheat flour is about 0.14:1. The food ingredient of the present invention, when used in conjunction with other ingredients used to make leavened and unleavened doughs and baked and dried products, produces products that have soy protein while unexpectedly retaining the structural properties and heights of specific leavened or unleavened foods. Products of the present invention have flavors that are not distastefully bitter and that are organoleptically pleasing.

Another embodiment of the present invention includes a leavened dough utilizing a straight dough method, or sponge, or a yeast leavened rolled-in dough, or an unleavened dough, or a dried dough made with the food ingredient. The leavened dough comprises defatted soy flour in a concentration of at least about 14 percent by weight of the dough. The unleavened dough and dried dough each comprise defatted soy flour in a concentration of at least about 7.5 percent by weight of the unleavened dough or dried dough.

The straight dough comprises a system of substantially uniform air cells that develop as do air cells in a soy-free straight dough. The sponge also comprises a system of substantially uniform air cells that develop as do air cells in a soy-free sponge made with wheat flour. The unleavened dough also comprises a system of air cells and protein network that develops as do soy-free unleavened doughs made with wheat flour. The dried dough comprises a protein network that develops as does a soy-free dried dough used to make a pasta.

One other embodiment of the present invention includes a baked dough product made with the food ingredient wherein the baked product has a soy protein concentration of at least about 3 grams of soy protein per 50 grams, or about 6% by weight of the product. This concentration compares to a conventional concentration of up to 3% soy protein by weight. The baked product has a structure and height that are substantially the same as if the product were soy-free. The baked product is free of distasteful bitterness and is generally organoleptically pleasing. Baked products with the food ingredient of the present invention include breads such as French bread, Italian bread, brioche, "wheat" bread, egg bread, multi-grain bread, buns, pizza crust, pita bread, calzones, baguettes, bagels, potato bread, variety bread, bread-based products such as bread sticks, rolled-in products such as rolls and pie crust, and unleavened products such as tortillas, and flatbread. Baked products also include chemically leavened products such as pancakes and waffles. However, soy protein levels in these products may be lower than 3 grams per 50 grams. Protein and/or phytochemical enhanced dried products of the present invention include pasta such as fettuccine, macaroni, spaghetti, rigatoni, fucilli, linguine, cannelloni, ravioli, trenette, lasagne and noodles.

One reason why the performance of the food ingredient of the present invention is unexpected is that it provides a significantly higher proportion of protein than one would expect in leavened products, based upon a wheat flour model while also having a food structure and texture that are substantially the same as a soy-free, lower protein product made with a flour other than soy flour, such as wheat flour.

Semolina is one type of wheat flour utilized in making pasta. Gluten is the principal source of protein for semolina and for other types of wheat flour. Additionally, as described, wheat gluten is the principal agent responsible for desirable protein network development.

Even soy-based yeast leavened products made with gluten in a concentration conforming to the natural ratio of gluten to wheat flour do not resemble soy-free products made with wheat flour. Instead, these products resemble soy-based, gluten-free products. These low gluten-containing soy products have a fragile air cell network that cannot withstand proofing, like soy-based, gluten free products. The air cell network is very coarse, as is shown at 10 in FIG. 1 and is uneven, and produces a product that is susceptible to crumbling and disintegration. This unsatisfactory texture has occurred even though the ratio of gluten to soy flour in the bread product 10 was 0.14:1 gluten to soy, which is the natural ratio. Bread products made with ratios less than 0.14:1 have even poorer textures and greater densities.

Soy-based unleavened products made with the natural ratio of gluten to wheat flour are softer than corresponding soy-free products. These products have a fragile structure and are susceptible to crumbling.

Previous efforts at making a protein-enhanced food ingredient have utilized soy products such as soy concentrate or soy isolate. These soy products have produced unsatisfactory baked foods and dried goods such as pasta. The baked goods have had a generally dense and gummy texture. The dried goods have had a generally soft texture susceptible to decomposition. It has surprisingly been found that use of soy flour, particularly defatted soy flour, in conjunction with gluten in a ratio that is at least about 1.5 times the natural ratio of gluten in wheat flour permits a fortification with a much greater protein concentration and/or phytochemical concentration than one skilled in the art would expect in light of the poor performance of the soy concentrate, soy isolate, and soy flour with a natural ratio of added gluten.

The expected deficiencies associated with elevated soy protein concentration and elevated gluten concentration do not occur in baked and dried products made with the ingredient of the present invention. To the contrary, elevated concentrations of soy flour and gluten, in combination, produce a texturally desirable product that has an increased height and elevated protein content and phytochemical content.

In one embodiment of the food ingredient of the present invention, the gluten is a vital wheat gluten, fortified with vitamin C, which is a dried, insoluble gluten protein of wheat flour from which the starch and soluble components have been removed by a washing process and which has been dried to a fine powdered state. Vital wheat gluten typically has a percent protein on a dry basis of 75 to 81 percent. The protein constituent breakdown of wheat gluten protein utilized in the ingredient of the present invention, in one embodiment, is substantially the same as the protein constituent breakdown of natural wheat gluten.

In one embodiment, the soy flour used in the food ingredient of the present invention is a defatted soy flour and is a byproduct of a soy oil extraction process. In one embodiment, the soy flour is 200 mesh and has 70 PDI, as measured in a Protein Dispersion Index, PDI, which is regarded as moderate.

While defatted flour is described, it is believed that full fat, re fatted, and lecithinated soy flour may be used in the present invention. It is believed that flour having a PDI within a range of 15 to 75 is usable for use in the present invention. It is believed that soy products such as soy concentrates and soy isolates may also be used, at least in combination with soy flour, with an elevated concentration of gluten to make a product of the present invention.

The defatted soy flour may be blended directly with the gluten in a specified ratio of about 0.20:1 to 0.40:1 gluten to soy. In one yeast leavened bread embodiment, the ratio is 0.26 gluten to soy. In one tortilla embodiment, the ratio is 0.32 gluten to soy. In one pasta embodiment, the ratio is 0.24:1 gluten to soy. This ratio is based upon the weight of gluten and the weight of defatted soy flour used in a particular formulation prior to mixing with other ingredients and prior to baking or drying. These particular ratios are presented for example only and are not intended to limit the scope of the present invention. While an upper ratio of 0.40 is described herein, this ratio is presented for specific embodiments and not to limit the scope of the present invention.

In another embodiment, the defatted soy flour and gluten are separately packaged or contained but are provided to a user with instructions for combining them. The package sizes may range from small sizes for a household to a bulk tank. Alternatively, the defatted soy flour and gluten are separately packaged in accordance with the ratio of about 0.20:1 to 0.40:1 gluten to defatted soy flour so that a user may merely combine the two packages to prepare the ingredient.

One other embodiment of the present invention includes a dry mix that comprises the protein and/or phytochemical enhancing food ingredient of the present invention. The dry mix is usable to make a specific product, such as a specific type of bread. The dry mix may be packaged with instructions for preparation and, in some instances, with molds for shaping the particular final product. For instance, a dry mix for making soy protein and/or phytochemical enhanced wheat bread of the present invention may be packaged with a mold for making hamburger buns or a mold for making hot dog buns.

Another embodiment of the present invention includes a dough usable to make a baked, yeast leavened or unleavened food product or dried dough such as pasta. The dough may be fabricated to be storable under refrigeration or freezing temperatures. The dough may be packaged under pressure, after proofing, or may be packaged in conjunction with proofing. The dough may be stored under pressure or may be stored at substantially ambient pressure by enclosing in a container that includes a pressure regulation mechanism. The dough may be stored and sold in a container that imparts a particular shape to the dough.

It has surprisingly been found that by combining soy flour with gluten in a ratio of about 0.20:1 to about 0.40:1, gluten to defatted soy flour, that the percent of soy flour that can be used to make bread is at least about 14.2%. Prior to the protein and/or phytochemical enhancing food ingredient of the present invention, it had been believed that soy flour in a concentration greater than 3% by weight of the product would produce a product having an unsatisfactory air cell structure and a reduced height. The dough and baked product of the present invention may have a soy flour concentration of at least about 10% by weight. These products have an air cell structure and height that are comparable to a soy-free leavened product made with wheat flour.

The benefit of the present invention is that the protein-fortified bread has a protein content of at least about 3 grams of soy protein per 50 grams of bread. At this high soy protein level, the bread has been found to have a desirable flavor which is not bitter or beany and a texture which is not a low volume, gummy or dense texture. Rather, the finished slice of bread, shown at 20 in FIG. 2, has structural features and a height similar to wheat bread or potato bread. Furthermore, the bread is moist and slightly heavy in texture with a sweet, light, wheat flavor and may be enriched in phytochemicals. Dough made utilizing the protein and/or phytochemical enhanced ingredient of the present invention rises in accordance with expectations for a conventional yeast leavened wheat flour-based dough with an air cell structure that is compatible with a yeast leavened wheat flour-based dough.

The protein and/or phytochemical enhancing food ingredient is suitable for use in preparing a yeast-leavened dough as well as a baked yeast-leavened product. In one embodiment, active dry yeast was added to the dough at a concentration of 1.8 to 2.2 pounds per 100 pounds of wheat/defatted soy flour. It is believed that the protein and/or phytochemical enhancing food ingredient is also suitable for use in a dough or baked good product, which is leavened by both yeast and a chemical leavening system. The protein and/or phytochemical enhancing food ingredient may also be used in conjunction with unleavened batters and doughs and baked products, such as tortillas and pita bread, as well as chemically leavened products such as pancakes and waffles.

Other ingredients that may be added to make a dough, along with the protein and/or phytochemical enhancing ingredient of the present invention, include sodium stearoyl lactylate, SSL. The SSL is added to extend freshness by softening the crumb as well as to aid in assuring an extra fine grain. Varying levels of SSL were tested. The highest bread volume and crumb softness was achieved at 12 ounces SSL per 100 pounds of wheat/ defatted soy flour. Other conventional concentration ranges of yeast and SSL are also suitable for use, however. The concentrations described herein are presented for example only and are not intended to limit the scope of the present invention.

All purpose shortening was added to dough to soften the crumb structure of the baked dough product and to extend shelf life of the baked dough product as well as to extend shelf life of the dough itself. One concentration used was 3.47 pounds shortening per 100 pounds of wheat/defatted soy flour. It is understood that other conventional concentration ranges of shortening are usable in the present invention. The concentrations described herein are presented for example only and are not intended to limit the scope of the present invention.

Salt and sugar were added to achieve desired flavor parameters. The salt and sugar concentrations were controlled so as not to adversely affect the fermentation of the yeast leavened dough and baked dough product.

Water concentration added to the dough was monitored carefully due to the absorptive capacity of the defatted soy flour. The defatted soy flour aids in retaining moisture if properly hydrated. In one embodiment, water was added in a concentration of 84.9 pounds of water per 100 pounds of wheat and defatted soy flour. It is understood, however, that other water concentrations may be suitable for other product embodiments.

Doughs were processed in a bread machine to control uniformity of mixing and proofing. A variety of mixing, kneading and rising times were tested with one desired condition determined to be 37 minutes for the mixing/rising portion, a 40 minute first rise with a 20 second punchdown, then allowing the dough to rest for 10 minutes. It is understood, however, that other conventional times are suitable for use in the present invention and that the present invention is not bound by the times presented herein. The dough was then removed from the machine and shaped into loaf form for a final rise. Both traditional mix and sponge doughs were prepared, each yielding similar baked dough products.

While wheat flour is described herein as being blended with soy flour, it is believed that other types of flours, such as corn, oat, potato, flax flour and meals may be added to make a multiflour blend.

The examples presented herein are provided for illustrative purposes only and not to limit the scope of any embodiment of the present invention.

EXAMPLE 1

Bread with Soy Flour and Gluten in the Natural Ratio

A yeast leavened bread made with soy flour was made with the following ingredients:

| Ingredient | Grams | Percent |
|---|---|---|
| Defatted soy flour (200/70) | 127.53 | 14.17 |
| Bread flour | 319.75 | 35.53 |
| Vital Wheat gluten, with Vitamin C | 17.39 | 1.93 |
| Active Dry Yeast | 8.55 | 0.95 |
| Granulated sugar | 34.83 | 3.87 |
| Salt, Fine prepared | 8.10 | 0.90 |
| Sodium Stearoyl Lactylate (SSL) | 3.24 | 0.36 |

-continued

| Ingredient | Grams | Percent |
|---|---|---|
| Shortening, all purpose | 14.94 | 1.66 |
| Water at 75 degrees Fahrenheit | 365.67 | 40.63 |
| Total | 900.00 | 100.00 |

The bread flour was a Gold Medal flour, manufactured by General Mills, Inc. of Minneapolis, Minn. The vital wheat gluten was manufactured by Hodgson Mills. The dry yeast was manufactured by Fleischmanns. The sugar was a C & H granulated sugar. The shortening and salt were manufactured by Cargill of Minneapolis, Minn. The SSL was manufactured by ICI.

The ratio of gluten to soy flour was 17.39 gms/127.53 gms or 0.14:1 gluten to soy flour. Water was added to an Oster 1.5 pound vertical bread machine, manufactured by Oster of McMinnville, Tenn. Dry ingredients, except for the yeast, were combined and added to a pan. A well was made in the dry ingredients and yeast was added. Shortening was then added on top of the dry ingredients. The mixture was processed on a No. 8 utilizing a 37 minute kneading/mixing time, a 40 minute rise time, a 20 second punchdown and a 10 minute rest period to make a dough.

The dough was removed from the pan with well greased hands. A loaf was shaped taking care not to break delicate gluten strands. The loaf was placed in a greased 4×8 inch bread pan, based upon bottom pan dimensions. The top of the loaf was greased and covered with wax paper. The loaf was allowed to rise until the loaf was 1 inch above the edge of the pan.

The loaf was baked in a preheated oven at 375 degrees Fahrenheit for 20 minutes. The loaf was covered with foil and baked an additional 20 minutes. The baked bread was removed from the pan immediately and allowed to cool on a cooling rack. The final cooled weight was 800 grams.

The soy flour content of the baked loaf was 15.88% after cook loss. The loaf had 7.94 grams of soy flour per 50 grams of bread and 4.13 grams of soy protein per 50 grams of bread. As can be seen at 10 in FIG. 1, the baked bread had a very coarse texture that crumbled easily. The texture was not strong or uniform. Because of the coarse texture, it was believed that the product could not withstand handling typically associated with commercial bread manufacture. The bread had large air cells throughout, with larger pockets of compressed air cells throughout. The size of the air cells rendered the product unsuitable for many consumer purposes. The large air cells further weakened the bread structure. The bread had a crust which was bumpy and uneven. The appearance of the crust was uneven with respect to browning. The bread had a gummy mouthfeel. This bread product was made with a ratio of gluten to soy flour which was at the upper end of the natural ratio range.

EXAMPLE 2

Bread Dough and Baked Bread of the Present Invention

A yeast-leavened bread dough was prepared with ingredients as listed:

| Ingredient | Grams | Percent |
|---|---|---|
| Bread flour | 303.39 | 33.71 |
| Defatted Soy flour 200/70 | 127.53 | 14.17 |
| Granulated sugar | 34.83 | 3.87 |

-continued

| Ingredient | Grams | Percent |
|---|---|---|
| Salt, Fine prepared | 8.10 | 0.90 |
| Shortening, all purpose | 14.94 | 1.66 |
| Water 75° F. | 365.67 | 40.63 |
| Active Dry Yeast | 8.55 | 0.95 |
| Vital Wheat gluten, with vitamin C | 33.75 | 3.75 |
| Sodium Stearoyl Lactylate (SSL) | 3.24 | 0.36 |
| Total | 900.00 | 100.00 |

In order to prepare the dough, the water was added to an Oster 1½ pound vertical bread machine pan. The Oster bread machine was manufactured by Oster of McMinnville, Tenn. Dry ingredients were combined and added to the bread machine pan. The dried materials included the yeast. The concentration of 14.17 percent soy flour corresponds to 42 pounds of soy flour per 100 pounds of wheat flour. Shortening was added on top of the dry ingredients. The ratio of gluten to soy flour for this dough was 33.75 gms/127.53 gms or 0.26:1 gluten to soy flour.

These ingredients were processed in the Oster bread machine with a profile of a 37 minute mixing/kneading step, a 40 minute rise step, a 20 second punch-down step and a 10 minute rest step. The dough was then removed from the bread machine with well-greased hands. The dough was shaped into a loaf. Care was taken not to break delicate gluten strands. The shaped loaf was placed in a greased 4 inch by 8 inch bread pan. The top of the loaf was greased and covered with wax paper. The loaf was allowed to rise until it was at a height of 1 inch above an edge of the pan. The dough was then baked in a preheated oven at 375° F. for 20 minutes. The baked loaf was covered with foil and then allowed to bake an additional 20 minutes. At that time, the bread was removed from the pan immediately and allowed to cool on a cooling rack. The final cool yield baked product weight 813 grams which is 90.33% of the original dough weight.

Figure 2:
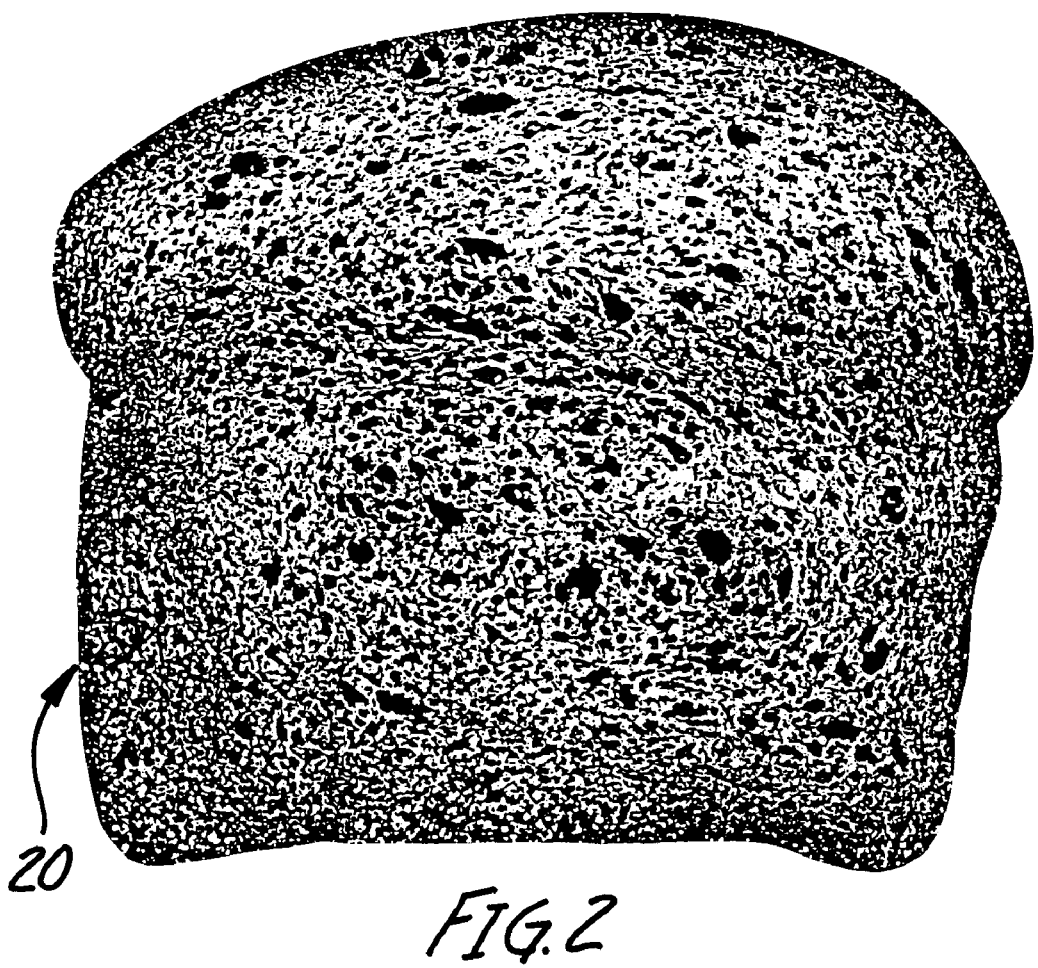
FIG. 2 is a top plan view of a slice of bread of one embodiment of the present invention.

A top plan view of a slice of the bread product is illustrated at 20 in FIG. 2. The baked product had a uniform and comparatively open air cell structure. The baked product had a much stronger and more uniform texture than the baked product shown in FIG. 1. It was believed that the product shown in FIG. 2 could withstand manufacturing and transportation conditions typically encountered by commercial breads. Further, the uniform texture rendered the bread suitable for consumer applications. The bread could be used to make sandwiches and could receive a material like jelly, without the jelly passing through the air cells, as would have happened with the product in FIG. 1.

The baked product had a pleasant flavor and mouthfeel. The product did not impart a "gummy" mouthfeel. The baked product had an even color and a crust that was uniform and not bumpy. The baked product had a soy protein concentration of about 4.1 gms/50 gms.

EXAMPLE 3

Pasta with Soy Flour

| Ingredient | Grams | Percent |
|---|---|---|
| Semolina Flour | 178.27 | 47.54 |
| Water | 120.00 | 32.00 |
| Defatted Soy Flour, 200/70 | 61.88 | 16.50 |
| Vital Wheat Gluten, with Vitamin C | 14.85 | 3.96 |
| Total | 375.00 | 100.00 |

In a 5 quart KitchenAid bowl, semolina flour and defatted soy flour manufactured by Cargill at Cedar Rapids, Iowa, were added and combined well using a flat beater. Water was added and combined with the flour at low speed until almost combined. A dough hook attachment, manufactured by KitchenAid, of Benton Harbor, Mich., was then employed. Mixing was continued for another 8 minutes on low speed. The dough was covered and allowed to rest in the bowl for 30 minutes. An pasta maker with a fettucine head was provided. The dough was passed through the pasta maker on setting Nos. 2 through 7, one step at a time. The dough had a gluten to soy protein ratio of 14.85/61.88 or 0.24:1 gluten to soy flour.

The finished pasta was formed into nests of 16 grams on drying racks. A fan was provided to aid drying the pasta. The dry weight ranged from 11.03 to 11.36 grams.

The dried pasta nest was cooked in boiling water, rinsed with cool water for 30 seconds and drained for 30 seconds. The pasta nests were then weighed. The cooked weights ranged from 22.47 grams to 23.84 grams.

The pasta had a very firm finished product. The product had no mealy or gummy mouthfeel, typically exhibited in pasta made with soy flour. The pasta did not have a bitter or "beany" flavor but a pleasant light wheat flavor with no aftertaste. The pasta is a good high protein, isoflavone-containing substitute to conventional wheat-based pasta. The soy protein content of the product was about 6.2 gms per 50 gms dry weight.

EXAMPLE 4

Wheat Flour-soy Tortillas

| Ingredient | Grams | Percent |
|---|---|---|
| AP Flour | 186.00 | 42.27 |
| Salt, Iodized | 2.1 | 0.48 |
| Defatted Soy Flour, 200/70 | 34.96 | 7.94 |
| Soybean Oil | 56.00 | 12.72 |
| Warm Water, Tap (100° F.) | 150.00 | 34.08 |
| Gluten | 11.04 | 2.51 |
| Total | 440.1 | 100 |

The AP flour was manufactured by the Pillsbury Company of Minneapolis, Minn. The defatted soy flour and salt were manufactured by Cargill, of Minneapolis, Minn. The gluten was manufactured by Hodgson Mills. The AP flour, soy flour, and salt were placed in a bowl of a Hamilton Beach processor Model FP05, manufactured by Hamilton Beach/Procter Silex in Washington, N.C. Oil was added, then processed for 3 seconds to form a mixture. With the machine running, water was poured through a feedtube in a steady stream. The machine was run until dough formed into a ball. The dough had a medium to stiff consistency. If the dough was too stiff, small amounts of water were added and the amount was recorded. The dough had a ratio of gluten to soy of 11.04/34.96 or 0.32:1 gluten to soy flour.

The dough was weighed into 44 gram dough balls, covered, and allowed to rest for 30 minutes. The dough was then placed onto a base of a tortilla press and was pressed firmly until the tortilla was 4 inches to 4½ inches in diameter. The tortilla was then transferred to a medium hot griddle. The tortilla was cooked for 2 minutes on each side until golden brown spots appeared randomly on each side. The cooked, cooled yield was recorded and ranged from 38.89 to 39.22 gms. The tortillas had about 3.0 gms of soy protein per 50 gm product.

There was no discemable difference in texture from a tortilla made with wheat flour, but no soy flour or added gluten only. The dough of the present invention was much less sticky than dough made with soy and no addition of gluten, rendering the pressing process much simpler. The dough was much more machineable and adaptable to commercial production.

Adding soy flour to replace one-fourth of the AP flour produced tortillas that had an appealing rich, full flavor. The flavor was better than the wheat based tortilla in that it had a "buttery" connotation.

EXAMPLE 5

Soy Pancakes

| Ingredient | Grams | Percent |
|---|---|---|
| Defatted Soy Flour 200/70 | 32.6 | 4.68 |
| AP Flour | 162 | 23.24 |
| Baking Powder | 16 | 2.30 |
| Granulated Sugar | 15 | 2.15 |
| Fresh egg, large, beaten lightly | 76 | 10.9 |
| Salt | 3 | 0.43 |
| Milk, 2% | 349 | 50.08 |
| Soybean Oil | 33 | 4.73 |
| Gluten | 10.4 | 1.49 |
| Total | 697 | 100 |

All dry ingredients were mixed together until combined in a 5 quart Kitchen Aid mixer with a flat beater. Eggs were added along with skim milk and oil. These ingredients were mixed at the lowest speed until combined, for about 30 seconds. The ratio of gluten to soy flour was 10.4/32.6 or 0.32:1 gluten to soy. A preheated griddle was sprayed at 350 Fahrenheit with nonstick cooking spray. 54 grams of batter was poured per pancake. The pancakes were cooked for two minutes on each side. The cooked weight ranged from 47.78 to 48.32 grams.

The cooked pancakes displayed a volume substantially the same as a soy free pancake. The cooked pancakes had a moist and tender texture and a size that was 4 to 4⅜ inches in diameter and ⅝ inches thick. The cooked pancakes contained isoflavones present in the soy flour.

While the invention has been particularly shown and described with reference to specified embodiments hereof, it will be understood by those skilled in the art that there are changes in form and details that may be made herein without departing from the spirit and scope of the invention.

What is claimed is:

1. A nutritive food product supplemented with soy protein, wherein the soy protein supplemented food product has a structure and a height substantially the same as a corresponding wheat flour based food product unsupplemented with soy protein, the nutritive food product consisting of:

gluten and defatted soy flour in a ratio of about 0.20:1 to about 0.40:1 by weight gluten to defatted soy flour;

Bread flour;

Yeast;

Granulated sugar

Shortening;

Water;

sodium stearoyl lactylate and salt.

2. The nutritive food of claim 1 wherein said gluten comprises wheat gluten.

3. The nutritive food of claim 1 wherein said gluten comprises vital wheat gluten.

4. A nutritive food consisting of:

gluten and defatted soy flour in a ratio of about 0.20:1 to about 0.40:1 by weight gluten to defatted soy flour;

bread flour;

yeast;

granulated sugar;

water;

shortening;

sodium stearoyl lactylate and salt.

5. A nutritive food, consisting of:

gluten and defatted soy flour in a ratio of about 0.20:1 to about 0.40:1 by weight gluten to defatted soy flour;

Semolina flour; and

Water.

6. A nutritive food, consisting of:

gluten and defatted soy flour in a ratio of about 0.20:1 to about 0.40:1 by weight gluten to defatted soy flour;

AP Flour;

Baking powder;

Granulated sugar;

one egg;

Milk;

Soybean oil; and

Salt.

7. The nutritive food of claim 6, wherein the milk is 2% milk.

8. A nutritive food, consisting of:

AP flour;

gluten and defatted soy flour in a ratio of about 0.20:1 to about 0.40:1 by weight gluten to defatted soy flour;

water;

soybean oil; and salt.

* * * * *

UNITED STATES PATENT AND TRADEMARK OFFICE
CERTIFICATE OF CORRECTION

PATENT NO. : 6,589,584 B1
DATED : July 8, 2003
INVENTOR(S) : Stark, Ann M.

It is certified that error appears in the above-identified patent and that said Letters Patent is hereby corrected as shown below:

Title page, Item [54] and Column 1, line 1,
Title, should read -- NUTRITIVE FOOD PRODUCT --.

Signed and Sealed this

Sixth Day of April, 2004

JON W. DUDAS
*Acting Director of the United States Patent and Trademark Office*